(12) United States Patent
Sim et al.

(10) Patent No.: US 10,827,269 B1
(45) Date of Patent: Nov. 3, 2020

(54) SYSTEM, METHOD, AND DEVICE FOR AUDIO REPRODUCTION

(71) Applicant: Creative Technology Ltd, Singapore (SG)

(72) Inventors: Wong Hoo Sim, Singapore (SG); Teck Chee Lee, Singapore (SG)

(73) Assignee: Creative Technology Ltd, Singapore (SG)

(*) Notice: Subject to any disclaimer, the term of this patent is extended or adjusted under 35 U.S.C. 154(b) by 0 days.

(21) Appl. No.: 16/544,588

(22) Filed: Aug. 19, 2019

(51) Int. Cl.
| *H04R 5/04* | (2006.01) |
| *H04S 5/00* | (2006.01) |
| *H04R 3/04* | (2006.01) |
| *G06F 1/16* | (2006.01) |

(52) U.S. Cl.
CPC .......... *H04R 5/04* (2013.01); *G06F 1/1632* (2013.01); *H04R 3/04* (2013.01); *H04S 5/005* (2013.01); *H04R 2205/021* (2013.01); *H04S 2400/05* (2013.01); *H04S 2400/07* (2013.01)

(58) Field of Classification Search
CPC ...... H04R 5/04; H04R 3/04; H04R 2205/021; G06F 1/1632; G06F 3/165; H04S 5/005; H04S 2400/05; H04S 2400/07
See application file for complete search history.

(56) References Cited

U.S. PATENT DOCUMENTS

| 4,829,570 | A | 5/1989 | Schotz |
| 5,719,574 | A | 2/1998 | Nishio et al. |
| 6,076,000 | A | 6/2000 | Lee |
| 6,233,343 | B1* | 5/2001 | Muranami ............ G06F 1/1632 361/679.23 |
| 6,356,793 | B1 | 3/2002 | Martin |
| 8,705,748 | B2 | 4/2014 | Walsh |
| 9,143,861 | B2* | 9/2015 | Schul ....................... H04R 5/04 |
| 2004/0014426 | A1* | 1/2004 | Moore ..................... H04R 3/14 455/70 |
| 2015/0237446 | A1* | 8/2015 | Katayama ............... H04S 3/008 381/163 |
| 2016/0021229 | A1* | 1/2016 | Lewis ................. H04M 1/7253 455/420 |
| 2016/0212538 | A1* | 7/2016 | Fullam ................ H04R 29/001 |
| 2018/0115844 | A1* | 4/2018 | Lu ........................... H04R 3/12 |

(Continued)

*Primary Examiner* — Fan S Tsang
*Assistant Examiner* — David Siegel
(74) *Attorney, Agent, or Firm* — Russell Swerdon; Desmund Gean

(57) ABSTRACT

System, device, and method for audio reproduction are provided. The system includes a media computing device and an electronic device connected such that their speakers can be used in combination in optimizing the audio reproduction of media being played or streamed. Each device can be portable and the audio reproduction can include virtual/spatial/surround audio reproduction. When connecting, the media computing device serves as a host and the electronic device serves as a slave for data communication. As such, the media computing device can process an audio signal into any portion for reproduction on any speaker. Further, when connecting and if needed, the electronic device serves as a host and the media computing device serves as a slave for power management. Depending on the system configuration, a suitable connection can be made via a wireless or single cable wired connection between the media computing device and the electronic device.

20 Claims, 4 Drawing Sheets

(56) References Cited

U.S. PATENT DOCUMENTS

2019/0042503 A1* 2/2019 Montero ............. G06F 13/4282
2019/0251951 A1* 8/2019 Forbes ................. G10L 13/047
2019/0273991 A1* 9/2019 Dusse ...................... H04R 5/04

* cited by examiner

SYSTEM, METHOD, AND DEVICE FOR AUDIO REPRODUCTION

BACKGROUND OF THE INVENTION

1. Field of the Invention

The present invention relates to audio processing. More particularly, the present invention relates to a system, method, and device for audio reproduction between a media computing device and an electronic device.

2. Description of the Related Art

There are various media computing devices that employ a speaker system that is not capable of optimizing the audio reproduction of media being played or streamed on it for a user's listening enjoyment. For instance, a speaker system with an undersized speaker driver does not allow the low frequency audio range to be adequately reproduced. This is particularly a larger issue with media computing devices that have limited space to adequately accommodate a suitable speaker system for handling the audio reproduction. The lack of optimization is further exacerbated when reproducing virtual/spatial/surround audio.

Therefore, there exists a need for a system, device, and method for optimizing audio reproduction in and/or with media computing devices.

SUMMARY OF THE INVENTION

In one aspect of the invention, a system for audio reproduction is provided. The system includes an electronic device and a media computing device, which is portable. The electronic device includes: 1) a first interface configured to communicate with the media computing device and receive from the media computing device only low frequency components of an audio signal; 2) a first processing unit configured to process the low frequency components of the audio signal for reproduction; 3) a first speaker configured to audibly reproduce the low frequency components of the audio signal such that they complement other frequency components of the audio signal that are being simultaneously reproduced by a second speaker of the media computing device; and 4) a second interface configured to connect with a power source for supplying power to the electronic device in order to audibly reproduce the low frequency components of the audio signal. The media computing device includes: 1) the second speaker; and 2) a second processing unit configured to communicate with the electronic device using a third interface, process the audio signal such that the low frequency components and the other frequency components are extracted from the audio signal, provide the low frequency components to the electronic device to process for reproduction on the first speaker, and process the other frequency components for reproduction on the second speaker. Each of the first and third interfaces is either a wired data interface, a wired data and power combo interface, a wireless data interface, the wired data interface and a wireless power interface, or the wireless data interface and the wireless power interface. The second interface is either a wired power interface or a wired data and power combo interface.

According to various embodiments, the media computing device is either a mobile smartphone, a laptop, a tablet, a TV, a PC, or a media player. Further, the wired data interface is associated with USB; the wired data and power combo interface is associated with USB Type-C; the wireless data interface is associated with Bluetooth, RF, IR, or Wi-Fi; the wireless power interface is associated with an inductive connection; and the wired power interface is associated with a detachable connection or a fixed connection.

In another aspect of the invention, an electronic device for audio reproduction is provided. The electronic device includes: 1) a first interface configured to communicate with a media computing device, which is portable, and receive from the media computing device only low frequency components of an audio signal; 2) a processing unit configured to process the low frequency components of the audio signal for reproduction; 3) a first speaker configured to audibly reproduce the low frequency components of the audio signal such that they complement other frequency components of the audio signal that are being simultaneously reproduced by a second speaker of the media computing device; and 4) a second interface configured to connect with a power source for supplying power to the electronic device in order to audibly reproduce the low frequency components of the audio signal. The first interface is either a wired data interface, a wired data and power combo interface, a wireless data interface, the wired data interface and a wireless power interface, or the wireless data interface and the wireless power interface. The second interface is either a wired power interface or a wired data and power combo interface.

According to some embodiments, the power source is integrated within the electronic device or separate from the electronic device. According to other embodiments, the first interface is a wired data and power combo interface that includes a link cable receptacle and a link cable controller; the processing unit includes a microprocessor, a digital to analog converter, and a power amplifier; and the power source is a power adaptor for also supplying power to the media computing device. Yet, according to other embodiments, the reproduced low frequency components complement the reproduced other frequency components by synchronized timing, amplitude matching, phase matching, or any combination of the above.

In yet another aspect of the invention, a method for audio reproduction is provided. The method includes: 1) connecting an electronic device having at least one supplemental speaker with a media computing device having at least one primary speaker where each speaker has a corresponding position in a user's listening space; 2) processing via the media computing device an audio signal to acquire at least one segregated audio signal component; 3) reproducing a first segregated audio signal component at the at least one supplemental speaker; and 4) reproducing any portion of the audio signal at the at least one primary speaker. The media computing device is portable. The reproduction of the first segregated audio signal component at the at least one supplemental speaker and any portion of the audio signal at the at least one primary speaker are synchronized for the user's listening enjoyment. The method may further include synchronizing vibration/motion from a vibration/motion device based on at least one portion of the first segregated audio signal component being reproduced at the at least one supplemental speaker. The at least one portion of the first segregated audio signal component is based on segregating the first segregated audio signal component. In addition, reproducing the first segregated audio signal component includes reproducing the at least one portion of the first segregated audio signal component at the at least one supplemental speaker.

According to some embodiments, the media computing device serves as a host and the electronic device serves as a slave for data communication between the electronic device and the media computing device. According to other embodiments, the electronic device also serves as a host and the media computing device also serves as a slave for power management between the electronic device and the media computing device. According to yet other embodiments, processing the audio signal to acquire at least one segregated audio signal component is performed along with virtualizing the audio signal. The audio signal is a multichannel audio signal and the at least one segregated audio signal component corresponds to a 0.1 channel extracted or derived from the multichannel audio signal. Processing the audio signal to acquire at least one segregated audio signal component may include segregating the audio signal into audio signal components based on frequency ranges corresponding to the at least one supplemental speaker as determined by the media computing device.

Some of the advantages of the present invention include: 1) enhancing virtual/spatial/surround audio reproduction for portable media computing devices; 2) a space saving solution for optimizing audio reproduction in or with a media computing device; 3) an energy efficient solution for optimizing audio reproduction while providing necessary power to a media computing device; 4) a flexible solution for adapting to various power adaptors of different media computing devices; 5) optimizing audio reproduction in or with a media computing device; and 6) scalable and/or dynamic solution for optimizing power management (e.g., dynamically matching power to fit power needs of media computing device and electronic device in real time). These and other features and advantages of the present invention are described below with reference to the drawings.

DETAILED DESCRIPTION OF PREFERRED EMBODIMENTS

Figure 1:
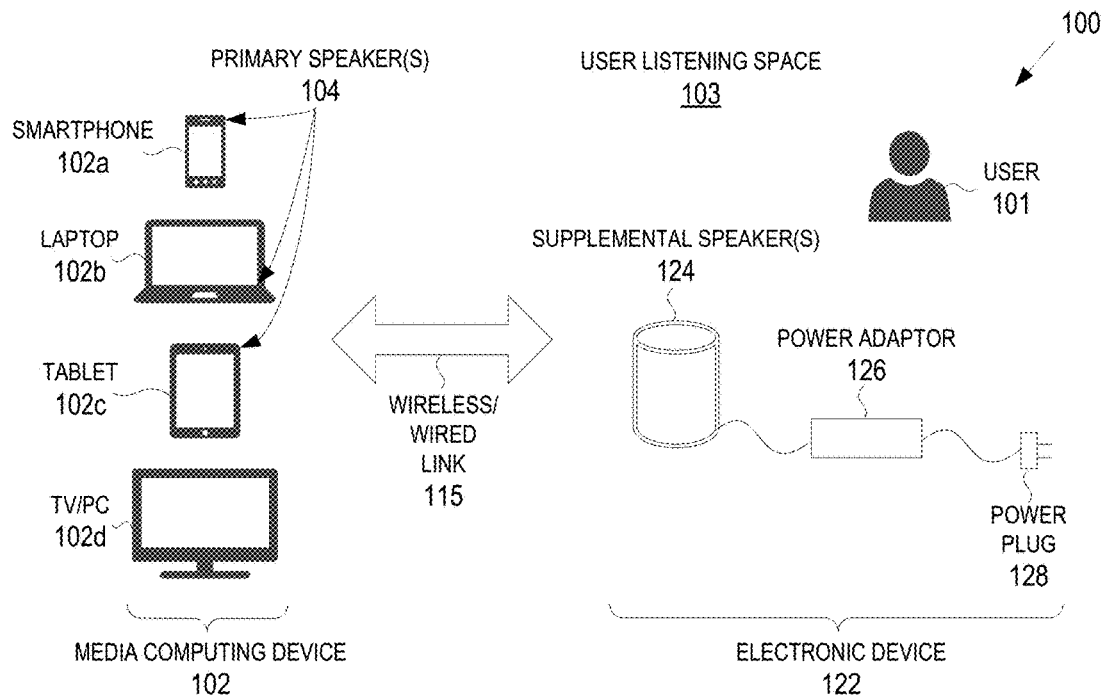
FIG. 1 is a system for audio reproduction between a media computing device and an electronic device according to various embodiments of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

System, device, and method for audio reproduction are provided. The system includes a media computing device and an electronic device connected such that their speakers can be used in combination in optimizing the audio reproduction of media being played or streamed. Each device can be portable, mobile, and/or handheld. The audio reproduction can include virtual/spatial/surround audio reproduction. When connecting, the media computing device serves as a host and the electronic device serves as a slave for data communication. As such, the media computing device can process an audio signal into any portion for reproduction on any speaker. Further, when connecting and if needed, the electronic device serves as a host and the media computing device serves as a slave for power management. The electronic device can either be integrated with or separate from a power adaptor. Depending on the system configuration, a suitable connection can be made via a wireless or single cable wired connection between the media computing device and the electronic device.

Advantageously, the present invention addresses the technical problem of optimizing audio reproduction associated with media computing devices. Optimization can be achieved at different levels. Audio is processed at the media computing device such that any portion can be reproduced at both the media computing device and the electronic device. The electronic device's speaker(s) together with the media computing device's speaker(s) can provide additional audio handling capabilities/capacities, increased audio soundstage, and/or improved audio virtualization/spatialization/surround sound; thus, optimizing the user's listening enjoyment. For instance, the low frequency portions of an audio signal can be extracted or derived from a multichannel audio signal and sent from the media computing device to the electronic device for reproduction on its supplemental speaker. The low frequency portions of the audio signal may correspond to a 0.1 channel of the multichannel audio signal. The need to filter out the low frequency portions at the electronic device can be eliminated if desired. As such, the system advantageously leverages off the media computing device's existing audio processing and audio reproduction capabilities in supplementing the audio reproduction with the connected electronic device.

Further, the system may advantageously reproduce the less directivity low frequency portions of the audio signal at the electronic device and the more directivity portions of the audio signal (e.g., other than low frequency portions of the audio signal) at the media computing device. Hence, a user of the media computing device can experience a more enhanced audio virtualization/spatialization/surround effect, especially when the media computing device's speakers are positioned at an optimal distance and height from a user. Yet, the electronic device can be configured to further provide audio processing capabilities (e.g., segregating the low frequency portions into sub-portions). As such, the system further advantageously provides an electronic device to supplement the audio processing of the media computing device by sharing the audio processing workload as needed.

For power management, the electronic device can further supplement the media computing device by providing power to it. In this case, the electronic device can be integrated with a power adaptor for powering both the electronic device and the media computing device. Since the media computing device may need a power adaptor to receive its power, this integration advantageously minimizing the number of items for a user to carry while supplementing the audio reproduction of the media computing device. Alternatively, the electronic device can be separate from the power adaptor where the electronic device is adapted for use in conjunction with various power adaptors.

FIG. 1 is a system 100 for audio reproduction between a media computing device 102 and an electronic device 122 according to various embodiments of the present invention. System 100 includes media computing device 102, electronic device 122, and wireless/wired link 115. Both media computing device 102 and electronic device 122 are normally positioned in a user listening space 103 of a user 101. Media computing device 102 includes any device capable of processing data, including but not limited to audio data associated with video, telephonic, or soundtrack media types. For example, media computing device 102 may either be a smartphone 102a, laptop 102b, tablet 102c, television/personal computer (TV/PC) 102d, or media player. Generally, media computing device 102 is also capable of sending processed audio to a primary speaker(s) 104 for audio reproduction. As such, media computing device 102 is associated with primary speaker(s) 104.

Electronic device 122 includes a supplemental speaker(s) 124, a power adaptor 126, and a power plug 128. Electronic device 122 is powered by power adaptor 126 that connects to a power outlet via power plug 128. Electronic device 122 may be integrated with power adaptor 126 and power plug 128 or separate from power adaptor 126 and power plug 128.

Media computing device 102 and electronic device 122 are capable of connecting together via wireless/wired link 115 in order to communicate with one another. Both media computing device 102 and electronic device 122 may implement a common communication interface and protocol to facilitate communication. Communication may include media computing device 102 sending over audio data to electronic device 122. In some embodiments, various portions of an audio signal may be sent. For example, only the low frequency audio components of the audio signal are sent from media computer device 102 to electronic device 122 for reproduction on supplemental speaker(s) 124. Yet, any portion or other portion of the audio signal may be sent from media computer device 102 for reproduction on primary speaker 104. In this way, system 100 provides an optimized audio reproduction for the user's listening enjoyment. Audio signal is any signal containing audio information including but not limited to a multichannel audio signal (e.g., stereo audio signal). System 100 may be associated with a multichannel audio speaker system including but not limited to a 1.1, 2.1, 5.1, 5.1.2, 7.1, or 7.1.2 audio speaker system. In a preferred embodiment, system 100 is a 2.1 audio speaker system.

Media computing device 102 may process data that includes audio processing and virtualization, which can be implemented based on Applicant's U.S. patent application Ser. No. 11/800,349, now U.S. Pat. No. 8,705,748, filed 4 May 2007 and entitled "METHOD FOR SPATIALLY PROCESSING MULTICHANNEL SIGNALS, PROCESSING MODULE, AND VIRTUAL SURROUND-SOUND SYSTEMS," which is herein incorporated by reference in its entirety. In media computing devices that are portable, the number of speakers and/or speaker frequency response may be limited. For example, laptop 102b may have just two speakers (i.e., stereo 2.0 audio speaker system) that each have a frequency response that is inadequate of reproducing audio below 1000 Hz. As such, electronic device 122 may be used to supplement the low frequency range of the audio signal by providing speaker driver(s) sized appropriately to reproduce them. Further, the inadequate speakers of laptop 102b may fail to provide virtualization that is optimized for the user's listening enjoyment. For example, laptop's 102b two speakers may be used to virtualize the audio signal such that they resemble a 5.1 or 7.1 audio speaker system. However, due to laptop's 102 inadequate speakers, virtualization is not optimized. For example, the two speakers cannot adequately reproduce the low frequencies of the audio signal (e.g., the 0.1 channel of a multichannel audio signal; bass) such that virtualization is enhanced. Hence, the user listening experience will suffer. As such, electronic device 122 may again be used to supplement the inadequacies (e.g., low frequency range of the audio signal; bass) by providing speaker(s) (e.g., bass reflex) and/or speaker driver(s) (e.g., woofers) sized appropriately to reproduce them where virtualization is optimized/enhanced. Although it may be possible to appropriately size laptop's 102b speakers, laptop 102b is often limited in space and not conducive in doing so. Audio processing may further include encoding/decoding an audio signal and enhancing certain components of the audio signal.

Figure 2:
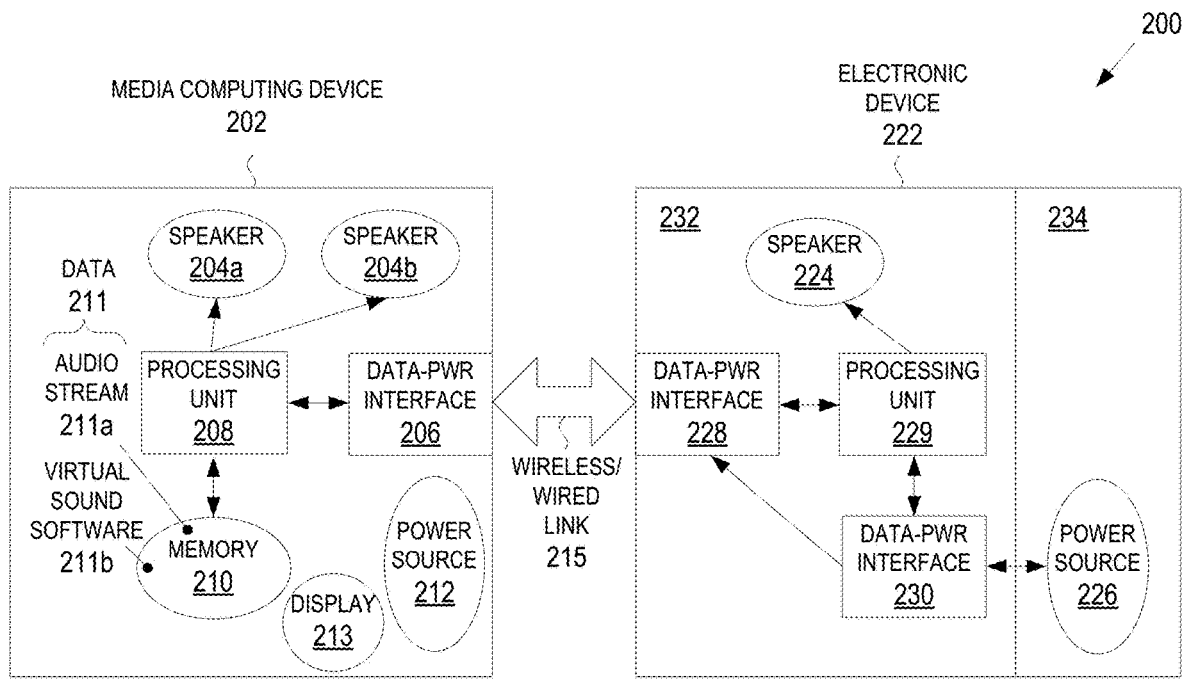
FIG. 2 is a system for audio reproduction between a media computing device and an electronic device according to various embodiments of the present invention.

FIG. 2 is a system 200 for audio reproduction between a media computing device 202 and an electronic device 222 according to various embodiments of the present invention. System 200 includes media computing device 202, electronic device 222, and wireless/wired link 215. Interconnects (e.g., for data, power, or both data and power) are shown that connect the different components of system 200 together. Regardless if shown or not shown, certain interconnects and/or components may be included or rearranged to achieve the audio reproduction optimizations of the present invention. Media computing device 202 includes a processing unit 208, a memory 210, a data-power (data-pwr) interface 206, speakers 204a and 204b [similar to primary speaker(s) 104], optional display 213, and a power source 212. Electronic device 222 includes a processing unit 229, a data-pwr interface 228, a data-pwr interface 230, a speaker 224 [similar to supplemental speaker(s) 124], and a power source 226. According to some embodiments, the components in electronic device 222 are separated into two chambers. For example, speaker 224 alone or with other components has an acoustic chamber 232 that is separate from a power chamber 234 housing the power source's power components. In other embodiments, speaker 224 alone or with other components has acoustic chamber 232 that shares with power chamber 234 housing the power source's power components.

For optimized audio reproduction, media computing device is configured such that processing unit 208 may access data 211 such as audio stream 211a and virtual sound software 211b stored in memory 210 or over the Internet; process audio stream 211a, which corresponds to an audio signal, with audio processing software such as virtual sound software 211b to generate audio portions [e.g., any portion or portions of the audio signal including portion(s) amounting to the whole audio signal]; and send the audio portions through a digital to analog converter and power amplifier to speakers 204a and 204b and to electronic device 222 via data-pwr interface 206. Electronic device 222 is configured such that processing unit 229 can receive the audio portion (e.g., only low frequency components of the audio signal) from data-pwr interface 206 via a corresponding data-pwr interface 228, which complements data-pwr interface 206 in establishing data communication there between via wireless/wired link 215; and process the audio portion through a digital to analog converter and power amplifier for audio reproduction at speaker 224.

For optimized power management, electronic device 222 may be configured such that processing unit 229 can provide appropriate power from power source 226 via data-pwr interfaces 228 and 230 to media computing device 202. For example, processing unit 229 can coordinate with processing unit 208 in providing or calibrating power from power source 226 to match the needs of media computing device 202 or power source 212, which is used to power media computing device 202. The matching may include matching voltage and/or power to drive corresponding components (e.g., speakers 204a, 204b; processing unit 208; display 213). Power sources 212 and 226 may be associated with a rechargeable battery or an adapter. Power sources 212 and 226 may be from stored power (e.g., a battery) or continuous power (e.g., AC-DC adapter). As such, electronic device 222 can be used as an external power bank or portable charger. Similarly, processing unit 229 can provide appropriate power from power source 226 via data-pwr interface 230 to electronic device 222.

As noted earlier, data-pwr interfaces 206 and 228 would complement each other depending on the wireless/wired link 215 to allow communication between media computing device 202 and electronic device 222. Data-pwr interfaces 206 and 228 may be nearly identical. Depending on implementation, data-pwr interfaces 206 and 228 may be associated with a wired data interface, a wired data and power combo interface, a wireless data interface, the wired data interface and a wireless power interface, or the wireless data interface and the wireless power interface. In addition, data-pwr interface 230 may be associated with a wired power interface or a wired data and power combo interface. Wired data interface may include for example a Universal Serial Bus (USB) Type-A connector and/or associated component(s); thus, wired link 215 may be a USB cable. Wired data and power combo interface may include for example a USB Type-C connector and/or associated component(s); thus, wired link 215 may be a USB Type-C cable. Wireless data interface may include a Wi-Fi, Bluetooth, radio frequency (RF), or infrared (IR) transmitter/receiver and/or associated component(s). Wired power interface may include a fixed solder connection or a detachable power connection (e.g., pin connection, USB Type-C connection). Wireless power interface may include an inductive connection (e.g., wireless charging).

In order to optimize the audio reproduction of the audio signal for the user's listening enjoyment, the audio reproduction of the audio portions from speakers 204a, 204b, and 224 should complement each other. For example, the reproduction of other than low frequency components of the audio signal at primary speakers 204a and/or 204b and the reproduction of low frequency components of the audio signal at supplemental speaker 224 can be complemented by utilizing synchronized timing, amplitude matching, phase matching, normalization, or any combination of these techniques during the processing of the audio signal. In some embodiments, a calibration of the system is required due to the fact that the locations of primary speakers 204a and/or 204b and supplemental speaker 224 may be arbitrary in relation to the user. Calibration may be manually or automatically performed. For example, a manual calibration may include having a user input the relative positions of the speakers of media computing device 202 and electronic device 222. For another example, a microphone can be placed on either media computing device 202 or electronic device 222 to pick up audio calibration tones generated from either media computing device 202 or electronic device 222 in automatically calibrating the system.

Figure 3:
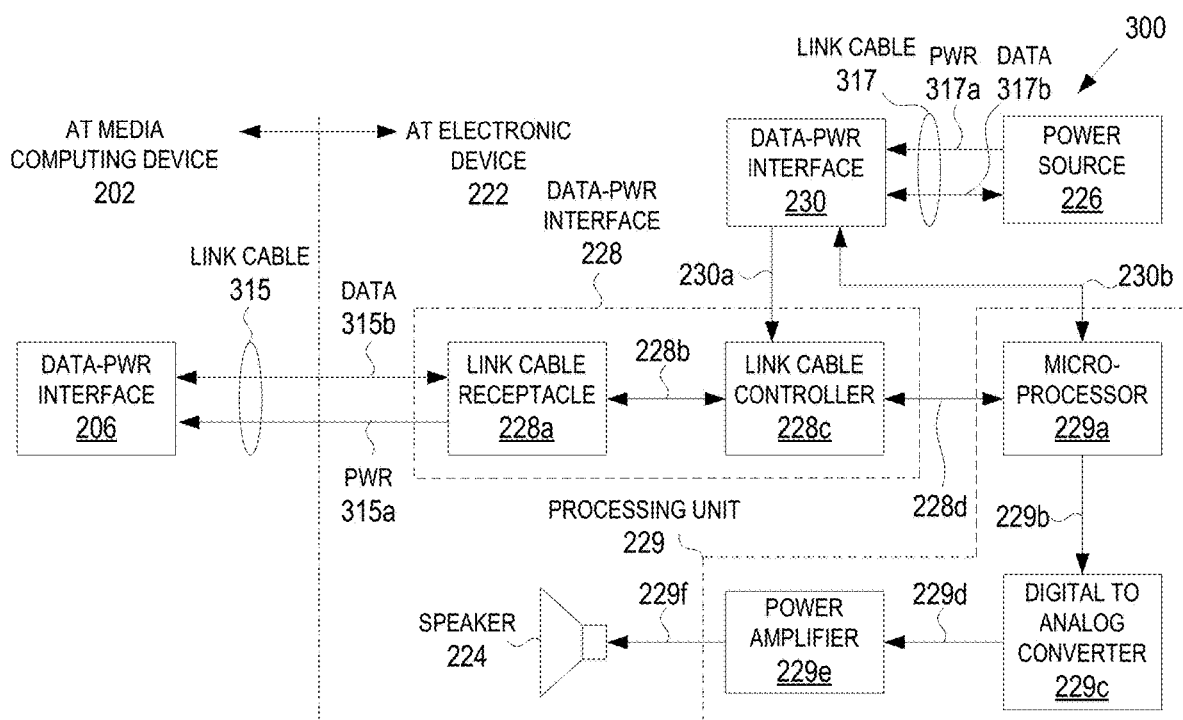
FIG. 3 is a portion of the system for audio reproduction between the media computing device and the electronic device as shown in FIG. 2 according to various embodiments of the present invention.

FIG. 3 is a portion 300 of the system for audio reproduction between the media computing device 202 and the electronic device 222 as shown in FIG. 2 according to various embodiments of the present invention. Interconnects (e.g., for data, power, or both data and power) are shown that connect the different components of portion 300 together. Regardless if shown or not shown, certain interconnects and/or components may be included or rearranged to achieve the audio reproduction optimizations of the present invention. In particular, portion 300 shows an exemplary data-pwr interface 228 and processing unit 229 of electronic device 222 where data-pwr interface 228 is associated with a wired data and power combo interface. A corresponding link cable 315 is used to provide pwr 315a and data 315b interconnects between data-pwr interface 206 at media computing device 202 and data-pwr interface 228 at electronic device 222. Link cable 315 may correspond to wired link 215. Data-pwr interface 228 includes a link cable receptacle 228a and a link cable controller 228c. Link cable receptacle 228a is configured for communicating with and delivering power (e.g., received from power source 226) to media computing device 202 via data-pwr interface 206. Link cable receptacle 228a is connected via interconnect 228b to link cable controller 228c, which is configured to facilitate the connection (e.g., establish, maintain, or terminate) between media computing device 202 and electronic device 222 via link cable 315. Link cable controller 228c is also connected via interconnect 228d to processing unit 229.

Processing unit 229, which may be similar to processing unit 208 and/or vice versa, includes a microprocessor 229a, a digital to analog converter 229c, and a power amplifier 229e. Microprocessor 229a is connected via interconnect 229b to digital to analog converter 229c, which is then connected via interconnect 229d to power amplifier 229e. Microprocessor 229a is configured to control/handle/manage any data communication, data processing, and power management aspects in electronic device 222 and with media computing device 202. For example, microprocessor 229a may receive any audio portion from data-pwr interface 228, process the audio portion if necessary (e.g., no processing, audio enhancement processing, segregating further any audio portion, processing supplemental to processing performed at media computing device 202, etc.), and send the audio portion through digital to analog converter 229c and power amplifier 229e for reproduction at speaker 224 via interconnect 229f. Microprocessor 229a may also communicate with power source 226 and media computing device 202 as well as regulate the power needs of electronic device 222 and media computing device 202. As shown, data-pwr interface 230 is associated with a wired data and power combo interface. Data-pwr interface 230 is configured to facilitate the connection (e.g., establish, maintain, and terminate) from power source 226 (via link cable 317 with pwr 317a and data 317b interconnects) to data-pwr interface 228 (via interconnect 230a) and processing unit 229 (via interconnect 230b) for powering the electronic device 222 and media computing device 202 as necessary. Link cable 317 may be similar to link cable 315. Link cable 317 and power source 226 may be integrated within electronic device 222 or separate from electronic device 222.

Figure 4A:
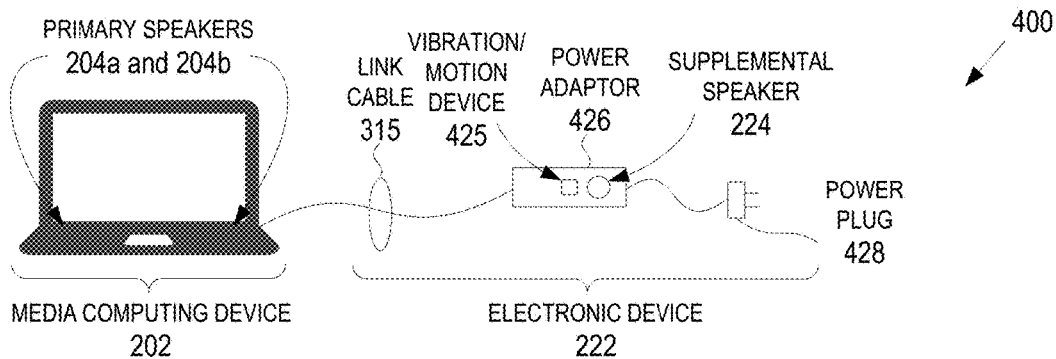
FIG. 4A is a system for audio reproduction between a media computing device and an electronic device integrated with a power adaptor according to various embodiments of the present invention.

FIG. 4A is a system 400 for audio reproduction between a media computing device 202 and an electronic device 222 integrated with a power adaptor 426 according to various embodiments of the present invention. Media computing device 202 includes primary speakers 204a and 204b for audio reproduction. Electronic device 222 includes power adaptor 426, link cable 315, a power plug 428, a vibration/motion device 425 and supplemental speaker 224. Electronic device 222 may replace or be used as a media computing device's power adaptor. As such, primary speakers 204a and 204b in combination with supplemental speaker 224 are configured for optimized audio reproduction. For example, primary speakers 204a and 204b may be left and right channels for reproducing mid to high frequency audio components (generally more directivity) and positioned in the user's listening space (e.g., height and distance from user's ears based on more directivity) for optimizing the user's listening enjoyment. Similarly, supplemental speaker 224 may be for reproducing low frequency audio components (generally less directivity) and also positioned in the user's listening space (e.g., height and distance from user's ears based on less directivity) for optimizing the user's listening enjoyment. Accordingly, system 400 is for optimizing audio reproduction.

Figure 4B:
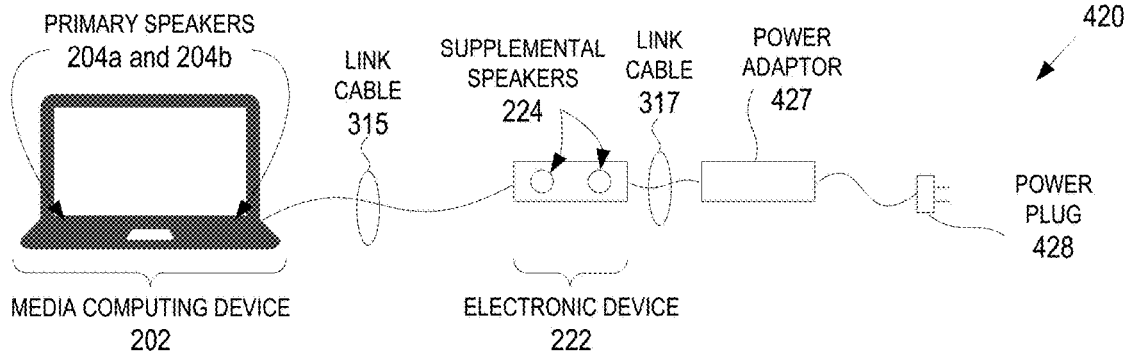
FIG. 4B is a system for audio reproduction between a media computing device and an electronic device with a separate power adaptor according to various embodiments of the present invention.

FIG. 4B is a system 420 for audio reproduction between a media computing device 202 and an electronic device 222 with a separate power adaptor 427 according to various embodiments of the present invention. Media computing device 202 includes primary speakers 204a and 204b for audio reproduction. Electronic device 222 is a separate device with link cable 315 and supplemental speakers 224. Electronic device 222 may supplement a media computing device's link cable 317, power adaptor 427, and power plug 428. As such, primary speakers 204a and 204b in combination with supplemental speakers 224 are configured for optimized audio reproduction. For example, primary speakers 204a and 204b may be left and right channels for reproducing mid to high frequency audio components and positioned in the user's listening space (e.g., optimized height and distance from user's ears or based on user's preference) for optimizing the user's listening enjoyment. Similarly, supplemental speakers 224 may be for reproducing low frequency audio components and positioned in the user's listening space (e.g., optimized height and distance from user's ears or based on user's preference) for optimizing the user's listening enjoyment. Accordingly, system 420 is for optimizing audio reproduction.

Figure 5:
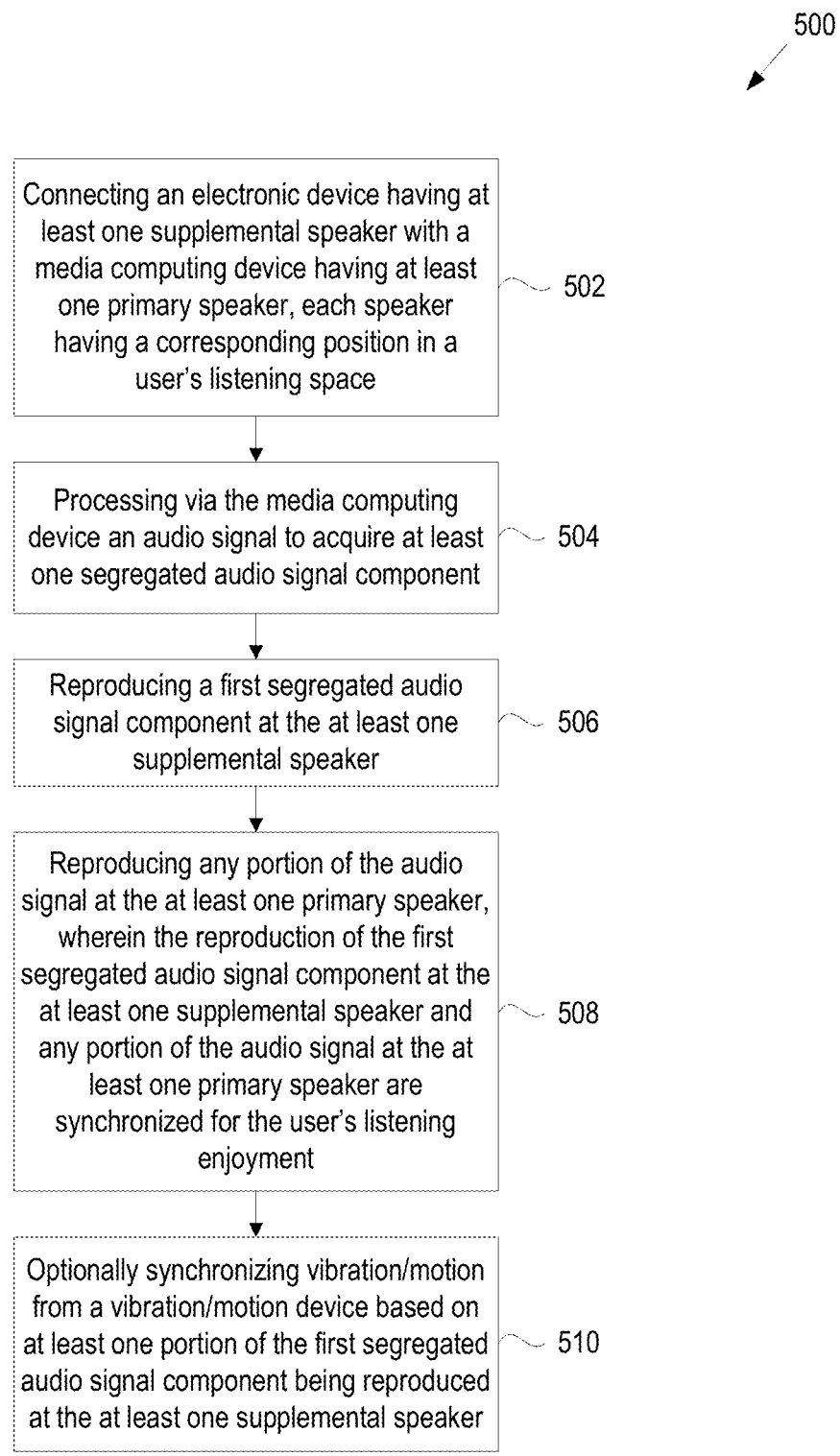
FIG. 5 is a flow diagram for audio reproduction between a media computing device and an electronic device according to various embodiments of the present invention.

FIG. 5 is a flow diagram 500 for audio reproduction between a media computing device and an electronic device according to various embodiments of the present invention. At step 502, connecting an electronic device having at least one supplemental speaker with a media computing device having at least one primary speaker is performed. Generally, each speaker has a corresponding position in a user's listening space. In a preferred embodiment, the media computing device is a portable device. Connecting the electronic device with the media computing device may include initializing data communication between the electronic device and the media computing device. In this case, data communication is bi-directional between the electronic device and the media computing device. Connecting the electronic device with the media computing device may be performed via a wired or wireless connection.

Connecting the electronic device with the media computing device may further include initializing power management between the electronic device and the media computing device such that power is provided from the electronic device to the media computing device. Typically, the media computing device serves as a host and the electronic device serves as a slave for data communication. Yet, the electronic device can serve as a host and the media computing device can serve as a slave for power management. Host and slave may perform any necessary actions to establish, maintain, or terminate data communications and/or power management, including but not limited to negotiations or requests-responses. According to a preferred embodiment, connecting the electronic device with the media computing device may be performed by using a single cable wired connection.

At step 504, processing via the media computing device an audio signal to acquire at least one segregated audio signal component is performed. Various processing techniques may be used, including filtering/extracting techniques such as applying a high pass filter or a low pass filter or all pass filter. For example, a low pass filter may be used to acquire only low frequency signal components of the audio signal. Processing the audio signal to acquire at least one segregated audio signal component can be performed along with virtualizing the audio signal. For example, the low frequency effects (LFE) channel from virtualization may be used as the segregated audio signal component while virtualizing the audio signal. Processing the audio signal to acquire at least one segregated audio signal component may include extracting a 0.1 channel from a multichannel audio signal (e.g., 5.1) or deriving a 0.1 channel from a multichannel audio signal (e.g., stereo audio signal; left-right audio signal). Processing the audio signal to acquire at least one segregated audio signal component includes segregating the audio signal into audio signal components based on frequency ranges. The frequency ranges may correspond to the at least one supplemental speaker's acceptable frequency response range as determined or acquired by the media computing device (e.g., the media computing device may query and/or receive from the electronic device the at least one supplemental speaker's technical specifications and requirements and have the at least one segregated audio signal component at least match/fit it). The segregation of the audio signal into audio signal components can be based on any technical requirement of the at least one supplement speaker. The first segregated audio signal component may correspond to a low frequency range below 1000 Hz or any subset thereof (e.g., 20-60 Hz; 60-250 Hz; 250-500 Hz; 500-1000 Hz). Yet, any portion of the audio signal may include a second segregated audio signal component that corresponds to any frequency range except the low frequency range or any subset thereof.

At step 506, reproducing a first segregated audio signal component at the at least one supplemental speaker is performed. Similarly, at step 508, reproducing any portion of the audio signal at the at least one primary speaker is performed. The reproduction of the first segregated audio signal component at the at least one supplemental speaker and any portion of the audio signal at the at least one primary speaker are synchronized for the user's listening enjoyment. Reproducing at steps 506 and 508 may include any processing necessary to reproduce any portion of the audio signal at the at least one primary speaker or the at least one supplemental speaker. Such processing may include but not limited to utilizing a microprocessor, digital to analog converter, or power amplifier. Processing may also include normalization. For example, the reproduction of the first segregated audio signal component at the at least one supplemental speaker and any portion of the audio signal at the at least one primary speaker are normalized such that any playback volume variances introduced by the relative positions of the at least one supplemental and primary speakers to the user are optimized for the user's listening enjoyment. For another example, the reproduction of the first segregated audio signal component at the at least one supplemental speaker and any portion of the audio signal at the at least one primary speaker are synchronized in time such that any time delays introduced by the relative positions of the at least one supplemental and primary speakers to the user are optimized for the user's listening enjoyment by audio calibration.

At step 510, optionally synchronizing vibration/motion from a vibration/motion device based on at least one portion of the first segregated audio signal component being reproduced at the at least one supplemental speaker is performed. The at least one portion of the first segregated audio signal component may be based on segregating the first segregated audio signal component where reproducing the first segregated audio signal component includes reproducing the at least one portion of the first segregated audio signal component at the at least one supplemental speaker. For example, the first segregated audio signal can be further processed by either processing unit 208 and/or processing unit 229 to acquire at least one portion of the first segregated audio signal component (e.g., first and second portions of the first segregated audio signal component) and reproducing them on the first and second supplemental speakers with synchronized vibration/motion from a vibration/motion device. Alternatively, synchronizing vibration/motion from a vibration/motion device based on the first segregated audio signal component being reproduced at the at least one supplemental speaker may be performed. Advantageously, vibration/motion will enhance the user's listening enjoyment when it is synchronized with particular portions of the audio signal (e.g., low frequency signal components, LFE channel, subsets of a segregated audio signal component). Further, the at least one supplemental speaker may be downward facing to enhance the reproduction effect of the first segregated audio signal component or the at least one portion of the first segregated audio signal component for improved user listening enjoyment.

Figure 6:
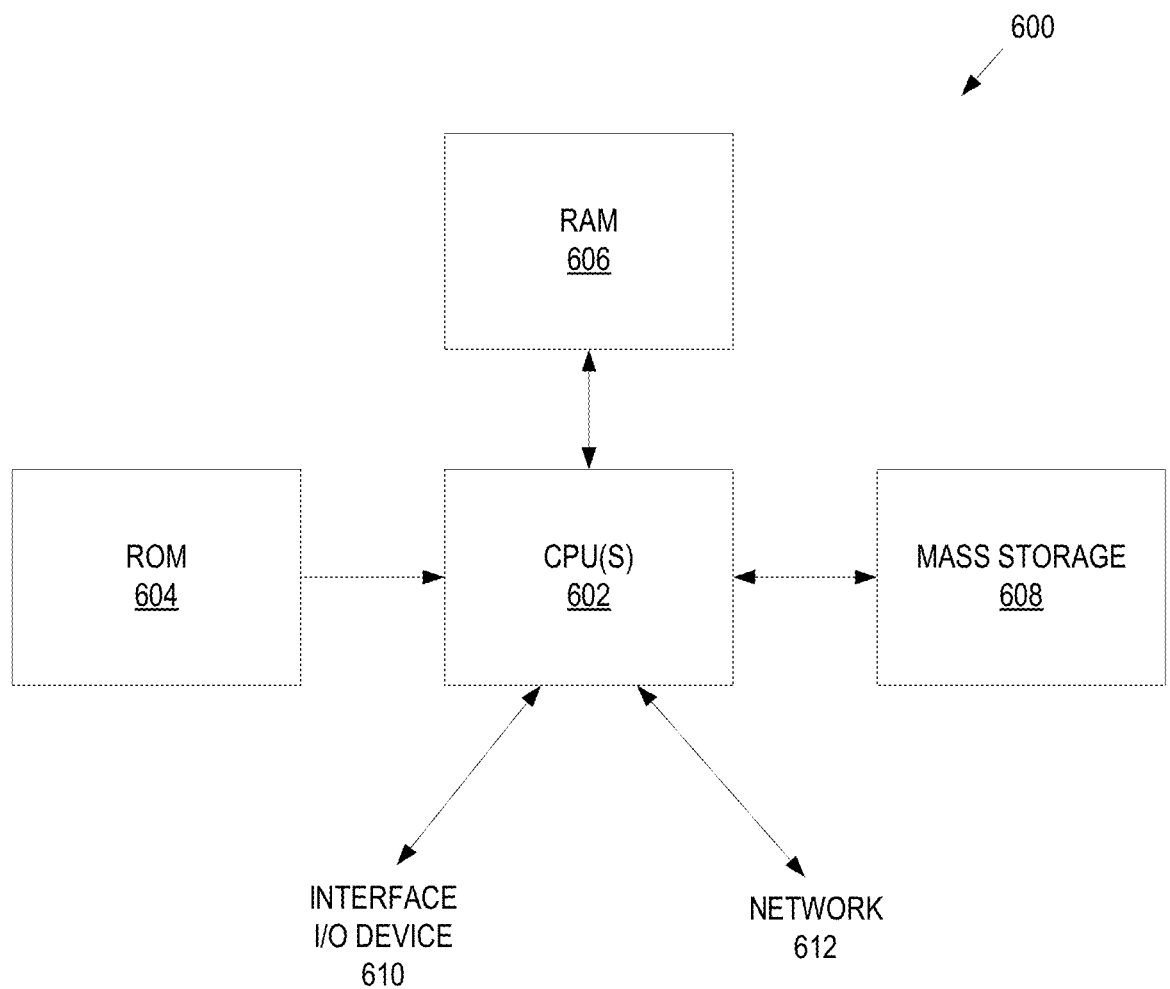
FIG. 6 illustrates a typical computer system that can be used in connection with one or more embodiments of the present invention.

FIG. 6 illustrates a typical computer system 600 that can be used in connection with one or more embodiments of the present invention. The computer system 600 includes one or more processors 602 (also referred to as central processing units, or CPUs) that are coupled to storage devices including primary storage 606 (typically a random access memory, or RAM) and another primary storage 604 (typically a read only memory, or ROM). As is well known in the art, primary storage 604 acts to transfer data and instructions uni-directionally to the CPU and primary storage 606 is used typically to transfer data and instructions in a bi-directional manner. Both of these primary storage devices may include any suitable non-transitory computer-readable media, including a computer program product comprising a machine readable medium on which is provided program instructions according to one or more embodiments of the present invention.

A mass storage device 608 also is coupled bi-directionally to CPU 602 and provides additional data storage capacity and may include any of the non-transitory computer-readable media, including a computer program product comprising a machine readable medium on which is provided program instructions according to one or more embodiments of the present invention. The mass storage device 608 may be used to store programs, data and the like and is typically a secondary storage medium such as a hard disk or flash drive. It will be appreciated that the information retained within the mass storage device 608, may, in appropriate cases, be incorporated in standard fashion as part of primary storage 606 as virtual memory. A specific mass storage device such as a CD-ROM or external flash drive may also pass data uni-directionally or bi-directionally respectively to the CPU.

CPU 602 also is coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. The above-described devices and materials will be familiar to those of skill in the computer hardware and software arts.

Advantageously, various embodiments of the present invention further provide: 1) improved audio virtualization/spatialization/surround sound for a portable media computing device; 2) compensation for the lack of optimal audio reproduction in media computing devices; 3) a single cable wired link for data and power solution to facilitate optimal audio reproduction; 4) smart intelligence for easy and fast connections; and 5) a configurable system to optimize user's audio listening preferences.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for audio reproduction, comprising:
an electronic device comprising:
a first interface configured to communicate with a media computing device and receive from the media computing device only low frequency components of an audio signal, the media computing device being portable;

a first processing unit configured to process the low frequency components of the audio signal for reproduction;

a first speaker configured to audibly reproduce the low frequency components of the audio signal such that the reproduced low frequency components complement other frequency components of the audio signal that are being simultaneously reproduced by a second speaker of the media computing device; and a second interface configured to connect with a power source for supplying power to the electronic device in order to audibly reproduce the low frequency components of the audio signal; and the media computing device comprising:

the second speaker; and a second processing unit configured to communicate with the electronic device using a third interface, process the audio signal such that the low frequency components and the other frequency components are extracted from the audio signal, provide the low frequency components to the electronic device to process for reproduction on the first speaker, and process the other frequency components for reproduction on the second speaker, wherein each of the first and third interfaces is selected from the group consisting of a wired data interface, a first wired data and power combo interface, a wireless data interface, a wired data and wireless power interface, and a wireless data and wireless power interface;

wherein the second interface is selected from the group consisting of a wired power interface and a second wired data and power combo interface; and wherein the first processing unit and the second processing unit are configured to actively coordinate with each other to manage the data communication and power management between the electronic device and the media computing device.

2. The system as recited in claim 1, wherein the media computing device is selected from the group consisting of a mobile smartphone, a laptop, a tablet, a TV, a PC, and a media player.

3. The system as recited in claim 2, wherein the media computing device is handheld and includes a display.

4. The system as recited in claim 1, wherein each of the wired data interface and the wired data and wireless power interface is associated with USB for data; wherein each of the first and second wired data and power combo interfaces is associated with USB Type-C; wherein the wireless data interface is associated with Bluetooth, RF, IR, or Wi-Fi; wherein each of the wired data and wireless power interface and the wireless data and wireless power interface is associated with an inductive connection for power; and wherein the wired power interface is associated with a detachable connection or a fixed connection.

5. An electronic device for audio reproduction, comprising:

a first interface configured to communicate with a media computing device and receive from the media computing device only low frequency components of an audio signal, the media computing device being portable;

a processing unit configured to process the low frequency components of the audio signal for reproduction;

a first speaker configured to audibly reproduce the low frequency components of the audio signal such that the reproduced low frequency components complement other frequency components of the audio signal that are being simultaneously reproduced by a second speaker of the media computing device; and a second interface configured to connect with a power source for supplying power to the electronic device in order to audibly reproduce the low frequency components of the audio signal, wherein the first interface is selected from the group consisting of a wired data interface, a first wired data and power combo interface, a wireless data interface, a wired data and wireless power interface, and a wireless data and wireless power interface;

wherein the second interface is selected from the group consisting of a wired power interface and a second wired data and power combo interface; and wherein the processing unit is configured to coordinate with a second processing unit in the media computing device and vice versa to manage the data communication and power management between the electronic device and the media computing device.

6. The electronic device as recited in claim 5, wherein the power source is integrated within the electronic device or separate from the electronic device.

7. The electronic device as recited in claim 5, wherein the first interface is a wired data and power combo interface comprising a link cable receptacle and a link cable controller; wherein the processing unit comprises a microprocessor, a digital to analog converter, and a power amplifier; and wherein the power source is a power adaptor for also supplying power to the media computing device.

8. The electronic device as recited in claim 5, wherein the reproduced low frequency components complement the reproduced other frequency components by synchronized timing, amplitude matching, phase matching, or any combination of the above.

9. The electronic device as recited in claim 5, wherein the first speaker has an acoustic chamber and the power source has a power chamber separate from the acoustic chamber, the power chamber encapsulating the power source's power components.

10. A method for audio reproduction, comprising:

connecting an electronic device having a first processor unit and at least one supplemental speaker with a media computing device having a second processor unit and at least one primary speaker, each speaker having a corresponding position in a user's listening space, the media computing device being portable;

processing via the media computing device an audio signal to acquire at least one segregated audio signal component;

reproducing a first segregated audio signal component at the at least one supplemental speaker; and reproducing any portion of the audio signal at the at least one primary speaker, wherein the reproduction of the first segregated audio signal component at the at least one supplemental speaker and any portion of the audio signal at the at least one primary speaker are synchronized for the user's listening enjoyment, and wherein the first processing unit and the second processing unit are each configured to coordinate with the other to manage the data communication and power management between the electronic device and the media computing device.

11. The method as recited in claim 10, wherein connecting the electronic device with the media computing device comprises initializing data communication between the electronic device and the media computing device.

12. The method as recited in claim 11, wherein connecting the electronic device with the media computing device further comprises initializing power management between the electronic device and the media computing device such that power is provided from the electronic device to the media computing device.

13. The method as recited in claim 12, wherein the media computing device serves as a host and the electronic device serves as a slave for data communication; and wherein the electronic device serves as a host and the media computing device serves as a slave for power management.

14. The method as recited in claim 12, wherein connecting the electronic device with the media computing device is performed by using a single cable wired connection.

15. The method as recited in claim 10, wherein processing the audio signal to acquire at least one segregated audio signal component is performed along with virtualizing the audio signal, wherein the audio signal is a multichannel audio signal and the at least one segregated audio signal component corresponds to a 0.1 channel extracted or derived from the multichannel audio signal.

16. The method as recited in claim 10, wherein processing the audio signal to acquire at least one segregated audio signal component comprises segregating the audio signal into audio signal components based on frequency ranges corresponding to the at least one supplemental speaker as determined by the media computing device, and wherein the media computer device determines the frequency ranges corresponding to the at least one supplemental speaker by acquiring them from the at least one supplemental speaker via data communication with the electronic device.

17. The method as recited in claim 10, wherein the first segregated audio signal component corresponds to a low frequency range below 1000 Hz, and wherein any portion of the audio signal includes a second segregated audio signal component that corresponds to any frequency range except the low frequency range.

18. The method as recited in claim 10, wherein the reproduction of the first segregated audio signal component at the at least one supplemental speaker and any portion of the audio signal at the at least one primary speaker are normalized such that any playback volume variances introduced by the relative positions of the at least one supplemental and primary speakers to the user are optimized for the user's listening enjoyment.

19. The method as recited in claim 10, wherein the reproduction of the first segregated audio signal component at the at least one supplemental speaker and any portion of the audio signal at the at least one primary speaker are synchronized in time such that any time delays introduced by the relative positions of the at least one supplemental and primary speakers to the user are optimized for the user's listening enjoyment by audio calibration.

20. A method for audio reproduction, comprising:
connecting an electronic device having at least one supplemental speaker with a media computing device having at least one primary speaker, each speaker having a corresponding position in a user's listening space, the media computing device being portable;
processing via the media computing device an audio signal to acquire at least one segregated audio signal component;
reproducing a first segregated audio signal component at the at least one supplemental speaker, wherein reproducing the first segregated audio signal component comprises reproducing at least one portion of the first segregated audio signal component at the at least one supplemental speaker, and wherein the at least one portion of the first segregated audio signal component is based on segregating the first segregated audio signal component,
synchronizing vibration/motion from a vibration/motion device based on the at least one portion of the first segregated audio signal component being reproduced at the at least one supplemental speaker; and
reproducing any portion of the audio signal at the at least one primary speaker,
wherein the reproduction of the first segregated audio signal component at the at least one supplemental speaker and any portion of the audio signal at the at least one primary speaker are synchronized for the user's listening enjoyment.

* * * * *